United States Patent [19]
Castrantas et al.

[11] Patent Number: 6,090,297
[45] Date of Patent: Jul. 18, 2000

[54] METHOD FOR TREATING TAILING SLURRIES WITH CARO'S ACID

[75] Inventors: Harry M. Castrantas, Newtown, Pa.; James L. Manganaro, Princeton, N.J.; Ralph S. Mikida, West Seneca, N.Y.; William Johnson, Yardley, Pa.

[73] Assignee: FMC Corporation, Philadelphia, Pa.

[21] Appl. No.: 08/903,180

[22] Filed: Jul. 30, 1997

Related U.S. Application Data

[60] Division of application No. 08/725,026, Oct. 2, 1996, abandoned, which is a continuation-in-part of application No. 08/491,439, Jun. 7, 1995, abandoned.

[51] Int. Cl.$^7$ .............................. C02F 1/72; C01B 15/06
[52] U.S. Cl. .................... 210/759; 210/904; 423/513; 423/521
[58] Field of Search .................... 423/513, 521; 210/759, 904

[56] References Cited

U.S. PATENT DOCUMENTS

| | | | |
|---|---|---|---|
| 2,663,621 | 12/1953 | Greenspan et al. | 23/166 |
| 2,789,954 | 4/1957 | Fell | 252/186 |
| 2,926,998 | 3/1960 | D'Addieco et al. | 23/166 |
| 3,510,424 | 5/1970 | Zumbrunn | 210/63 |
| 3,900,555 | 8/1975 | Jourdan-Laforte | 423/365 |
| 3,939,072 | 2/1976 | Laforte | 210/96 R |
| 4,049,786 | 9/1977 | Chiang | 423/513 |
| 4,915,849 | 4/1990 | Griffiths et al. | 210/759 |
| 5,141,731 | 8/1992 | Meier et al. | 423/521 |
| 5,194,163 | 3/1993 | Saugier | 210/759 |
| 5,304,360 | 4/1994 | Lane et al. | 423/521 |
| 5,397,482 | 3/1995 | Castrantas et al. | 210/759 |
| 5,439,663 | 8/1995 | Manganero et al. | 423/521 |
| 5,470,564 | 11/1995 | Magnanaro et al. | 423/521 |

FOREIGN PATENT DOCUMENTS

| | | | |
|---|---|---|---|
| 756266 | 3/1971 | Belgium | 210/904 |
| 1560450 | 3/1969 | France | 210/904 |
| 738407 | 10/1955 | United Kingdom | |
| WO9207791 | 5/1992 | WIPO | |
| WO9211200 | 7/1992 | WIPO | |

*Primary Examiner*—Gary P. Straub
*Assistant Examiner*—Timothy C Vanoy
*Attorney, Agent, or Firm*—Frank Ianno; Patrick C. Baker; Bruce M. Monroe

[57] ABSTRACT

A process for treating precious metal tailing slurries with Caro's acid, in which the Caro's acid is accompanied by reduced amounts of Caro's acid mist, is disclosed. The hot Caro's acid-containing mixture, formed by reaction of concentrated sulfuric acid and hydrogen peroxide, is quenched with water to reduce or eliminate the Caro's acid mist. The resulting cooled and diluted mixture is introduced into a precious metal tailings slurry to reduce the amount of cyanide values in the slurry.

15 Claims, No Drawings ns(6,090,297)

METHOD FOR TREATING TAILING SLURRIES WITH CARO'S ACID

This application is a divisional of application Ser. No. 08/725,026, filed Oct. 2, 1996, now abandoned, which is a continuation-in-part of application Ser. No. 08/491,439, filed Jun. 7, 1995, now abandoned.

FIELD OF TH INVENTION

The invention is in the field of producing Caro's acid by reaction of hydrogen peroxide and sulfuric acid in a controlled and effective manner.

DESCRIPTION OF PRIOR ART

Caro's acid, which is peroxymonosulfuric acid, is a strong oxidizing compound which has been suggested for use in any applications including purification of cyanide-containing effluents by conversion of their cyanides into non-toxic derivatives. Caro's acid is usually produced by reacting together concentrated sulfuric acid (85% to 98% by weight $H_2SO_4$) with concentrated hydrogen peroxide (50% to 90% by weight $H_2O_2$) to produce an equilibrium mixture of Caro's acid containing peroxymonosulfuric acid ($H_2SO_5$), sulfuric acid and hydrogen peroxide. However, since the Caro's acid is not stable for long periods it must be made and immediately used on site or quickly cooled and stored at refrigerated temperatures. In general, the Caro's acid is manufactured on site as needed and in just the amounts required for the specified application without the necessity of having to store any excess amounts.

One procedure for producing Caro's acid is set forth in U.S. Pat. No. 3, 900,555 by using an apparatus described in U.S. Pat. No. 3,939,072 for mixing the sulfuric acid and hydrogen peroxide and cooling the mixture with a water-cooled jacket to prevent overhearing of the reactants and premature decomposition of the monoperoxysulfuric acid product. These patents teach the use of the monoperoxysulfuric acid product for treating waste aqueous effluents from an electroplating plant containing cyanide ions while simultaneously adding an alkali in amounts suitable for neutralizing the added acid. This assures that the pH of the treated solution in maintained at a specified alkaline value, normally pH 9, by neutralizing any acidity resulting from the added acid.

Another procedure is set forth in U.S. Pat. No. 4,915,849 wherein the Caro's acid is used to treat cyanide-containing effluents from an ore-processing plant. The Caro's acid is manufactured by reacting sulfuric acid with hydrogen peroxide in proportions corresponding to between 0.01 and 0.5 moles of sulfuric acid per mole of hydrogen peroxide. The resulting acid is then added to the cyanide-containing effluent simultaneous with aqueous lime or sodium hydroxide mixtures in order to maintain the effluent at the preferred pH of between 9.5 and 11.5.

Still another procedure is set forth in PCT Publication No. WO 92/07791, a published patent application of Lane et al., which teaches production of peroxymonosulfuric acid by introducing a hydrogen peroxide solution into a stream of sulfuric acid flowing through a reaction chamber, the $H_2O_2$ introduction being made between the sulfuric acid inlet and the reaction mixture outlet. Both the hydrogen peroxide solution and sulfuric acid are introduced under pressure into the closed tubular reaction chamber of the invention. In the reaction, chamber, the through-put per minute of the reaction chamber is at least about 20 times its internal volume measured between the inlet for the hydrogen peroxide and the outlet.

In carrying out the production of Caro's acid in industrial applications, two problems have arisen in the scale-up of the Caro's acid generating unit to commercial proportions. The first problem is the protection of a large amount of hydrogen peroxide in storage tanks, used to feed the Caro's acid producing generator, from possible contamination. The need to prevent contamination of this large hydrogen peroxide source from either Caro's acid, sulfuric acid, or other such impurities is critical to the safe containment and use of the hydrogen peroxide. The second problem is to control the Caro's acid reaction so that the Caro's acid is formed efficiently with maximum use of the hydrogen peroxide reagent and without having the hot reaction mixture formed during the reaction go out of control and overflow or rupture the reaction chamber.

With respect to the first problem, it has been the custom in the industry to isolate the storage tank of peroxide from the reactor where Caro's acid is produced by means of an intermediate tank (sometimes called a "break" tank) to interrupt the stored hydrogen peroxide source from the line delivering hydrogen peroxide to the Caro's acid generator. The peroxide from the storage tank is passed by pump means or by gravity into the top of an intermediate tank to a given level in the intermediate tank without requiring a direct liquid connection between the peroxide in the intermediate tank and the line flowing from the storage tank. This assures that any possible contamination which may be sucked back from the Caro's acid generator into the intermediate tank will not be able to flow into the hydrogen peroxide storage tank.

The second problem arises because the reaction of sulfuric acid and hydrogen peroxide is an exothermic reaction and some hydrogen peroxide decomposes to form large amounts of gas which may cause pressure build up capable of rupturing the reactor or causing the reagents to overflow. This may cause the hot reaction mixture to go out of control with the waste of both sulfuric acid and hydrogen peroxide and further, if no break tank is used, may become a possible source of contamination of the hydrogen peroxide storage tank if it backs up into the hydrogen peroxide line connecting the hydrogen peroxide storage tank to the Caro's acid reactor.

In James L. Manganaro et al., U.S. Pat. No. 5,470,564, a process is described that overcomes the foregoing problems. This process for producing Caro's acid is carried out by reacting sulfuric acid having an concentration of at least about 85% by weight and hydrogen peroxide having a concentration of at least about 50% by weight, wherein the hydrogen peroxide is introduced through a first feed line and the sulfuric acid is introduced through a second feed line into a funneling zone open to the atmosphere, the first feed line and second feed line having air gaps between their ends and the funneling zone, passing said hydrogen peroxide and sulfuric acid by gravity flow from said funneling zone into one end of a reaction zone that has been sized to permit a pressure drop therein which is at least 8 times the theoretical pressure drop for liquids flowing through such reaction zone and removing a mixture containing Caro's acid from an exit end of the reaction zone.

While the above process has been very successful in eliminating the need for break tanks and avoiding pressure buildups in the reactor, the Caro's acid that issues from the end of the reactor open to the atmosphere is quite hot because of the exothermic reaction between the sulfuric acid and hydrogen peroxide and tends to form an undesired Caro's acid mist. The Caro's acid mist is an irritant to the mucus membranes of workers who are in the vicinity of the outlet of the Caro's acid reactor. The mist is especially objectionable when the reactor is inside a building where the mist can collect and build up in concentration to a point where protective gear and/or special exhaust provisions are required. Even outdoors the mist is noticeable and most objectionable to any workmen who may be downwind from the Caro's acid reactor. Further, when the Caro's acid is used to treat tailing slurries to reduce their cyanide concentrations, the mixing of the Caro's acid with the tailing slurries is not instantaneous due to the syrupy nature of the concentrated Caro's acid that issues from the Caro's acid generator and the high density of the tailing slurries (35% to 40% solids). This is undesired because it allows time for the Caro's acid to decompose before reacting with the cyanide in the tailing slurry.

SUMMARY OF THE INVENTION

It has now been found that the Caro's acid mist, that forms when Caro's acid is produced by reaction of sulfuric acid and hydrogen peroxide in a reaction zone and the hot Caro's acid mixture is released from the end of the reaction zone, can be reduced or eliminated by quenching the hot Caro's acid mixture with water to both cool and dilute the Caro's acid.

DETAILED DESCRIPTION OF THE INVENTION

In carrying out the present invention, the Caro's acid is produced by reacting sulfuric acid and hydrogen peroxide together, preferably in a continuous manner and in accordance with the process set forth in James L. Manganaro et. al., U.S. Pat. No. 5,470,564, While other processes may also be employed for producing the Caro's acid, this is the preferred method because the Caro's acid is formed efficiently with maximum use of hydrogen peroxide reagent and without having the hot reaction mixture formed during the reaction go out of control and overflow or rupture the reaction chamber. In this process the reactants are added into a funneling zone, or other type of feeding zone, open to the atmosphere and then the hydrogen peroxide and sulfuric acid flow from the funneling zone by gravity into one end of a reaction zone where the reaction takes place. The reaction zone which is located downstream from the funneling zone is preferably a pipe-like or tube reactor, whose diameter may be variable or constant, which may be either vertically oriented or horizontally oriented or any skew angle intermediate these two extremes and is fed by gravity from the funneling zone. Further, it is preferred that the reaction zone have a size which permits a pressure drop in the reaction zone which is at least eight times the theoretical pressure drop for liquids passing through such reaction zone. Such reaction zones are normally static reactors containing several mixing elements which ensure a complete mixing and reaction of the two reagents.

The sulfuric acid employed in the reaction can be of any concentration from about 85% by weight to about 98% by weight $H_2SO_4$ with about 93% by weight sulfuric acid being preferred because of its ready availability and workability. The hydrogen peroxide employed can be of any concentration from about 50% by weight $H_2O_2$ to about 90% by weight $H_2O_2$ with 70% by weight hydrogen peroxide being preferred because of safety considerations and availability. The mole ratios of sulfuric acid to hydrogen peroxide ($H_2SO_4/H_2O_2$) can range from about 1/1 to about 4/1 with about 2/1 to about 3/1 being preferred. The reaction results in Caro's acid being formed in a solution which is an equilibrium mixture of hydrogen peroxide, sulfuric acid, Caro's acid and water. The equation for this reaction is set forth below:

$$H_2SO_4 + H_2O_2 \leftarrow H_2SO_5 + H_2O$$

A typical composition prepared from a 2.5/1 mole ratio of 93 weight percent sulfuric acid and 70 weight percent hydrogen peroxide is as follows: Caro's Acid (peroxymonosulfuric acid) 25 weight percent; sulfuric acid 57 weight percent; hydrogen peroxide 3.5 weight percent; and water 14.5 weight percent. A considerable amount of heat is released as a result of mixing the hydrogen peroxide with sulfuric acid. The amount of heat released depends on the concentration of the starting reagents and the mole ratios of sulfuric acid to hydrogen peroxide. Using the preferred concentrations of 70 weight percent $H_2O_2$ and 93 weight percent $H_2SO_4$ and a preferred mole ratio of $H_2SO_4/H_2O_2$ of 2.5/1, an increase in temperature of 58° C. will occur. If, for example, the raw materials are at 34° C., the Caro's acid will reach a temperature of 92° C. However, even outside the preferred concentrations of hydrogen peroxide and sulfuric acid and preferred mole ratios of $H_2SO_4/H_2O_2$ we have found in our experimental work that the Caro's acid mixture exiting from a reactor always reaches a temperature of at least about 52° C., with a temperature of from about 52° C. to about 98° C. being typical. The term "hot" as used hereinafter in the specification and claims with reference to Caro's acid or a Caro's acid mixture means temperature of at least about 52° C., with a range of temperature of from about 52° C. to about 98° C. being expressly included.

Caro's acid mist is generated as the hot Caro's acid mixture exits the reactor unit. In the case of treating precious metal tailings slurry to reduce their cyanide values ($CN^-$), Caro's acid is added directly from the reactor to the tailings slurry. The Caro's acid mist is released as the Caro's acid mixture free falls between the end of the Caro's acid reactor and the surface of the tailings slurry. Further, mist is released as the Caro's acid spreads out onto the surface of the slurry before it mixes with the tailings slurry. The higher the Caro's acid temperature, the more acid mist is generated. Mixing of the Caro's acid with the tailing slurry is not instantaneous due to the syrupy nature of the concentrated Caro's acid and the high density of the tailings slurry (35%–40% solids). The temperature of the tailing slurry also can affect the amount of acid mist generated. Warm or hot slurry will contribute to more mist than slurry at ambient temperatures. The Caro's acid mist thus generated can be particularly objectionable if the Caro's acid is employed indoors, where acid mist can build up. At some gold mines the tailing sump, a common injection point for Caro's acid to control the cyanide concentrations of the tailings slurry, is located indoors. The acid mist has a sharp odor which can cause irritation of the mucus membranes. The acid mist is also corrosive to equipment and instruments used in precious metal recovery sites. Where the injection point for Caro's acid to a tailings pond is located outdoors, the Caro's acid mist is extremely objectionable to anyone downwind from the site where the mist is generated.

In accordance with the present invention, the Caro's acid mist can be substantially reduced or even eliminated by quenching the hot Caro's acid mixture with water to both cool and dilute the mixture as it exits the Caro's acid reactor. The above quenching of the above hot Caro's acid mixture can take place in a number of ways. One way is to direct water sprays at the base of the pipe where the Caro's acid mixture exits. The water sprays simultaneously emit water streams directly into the Caro's acid mixture and also form a curtain of water droplets that surround the end of the pipe from which the Caro's acid mixture exits. A second method for carrying out the above quenching of the Caro's acid mixture is to introduce dilution water into an annular tube surrounding the outside of the pipe from which the Caro's acid mixture exits resulting in a ring of water flowing co-currently with the Caro's acid contained within the water ring. The Caro's acid and water intimately mix as they fall from the exit pipe of the Caro's acid reactor and the ring of water prevents any release of the Caro's acid mist before it is scrubbed and reacts with the water to quench and dilute the Caro's acid.

Another system for quenching the Caro's acid mixture is to attach a water aspirator to the pipe from which the Caro's acid mixture exits. As the Caro's acid mixture exits from the pipe, water will be aspirated into the mixture, mixed with the Caro's acid and both cool and dilute the Caro's acid before it exits the aspirator pipe. Another alternate technique for quenching the hot Caro's acid mixture is to attach a static mixer to the exit pipe of the Caro's acid reactor wherein water and the Caro's acid mixture are passed simultaneously into the static mixture in order to quench the Caro's acid. The static mixer is a desirable method of carrying out the quenching operation because it allows intimate contact of the Caro's acid and water simultaneously and with varying amounts of water as desired. The instant mixing of the water and Caro's acid assures immediate dilution and cooling of the Caro's acid before it exits from the static mixer into the tailings sump. Finally, the simplest and most economic way of carrying out the quenching of the Caro's acid mixture is to place the exit tube of the Caro's acid reactor into a container in which a continuous water stream is directed with the exit tube being below the level of the water that is present in the container. In other words the exit tube is placed into a container full of water, below the water level, and into which a continuous water stream is directed and overflows the container. In this way there is instantaneous quenching of the Caro's acid mixture as it exits the tube into the container of water and the constant supply of water into the container results in overflowing a diluted Caro's acid mixture from the container into the tailings pond. Since the exit pipe from the Caro's acid reactor is below the water level in the container no mist or Caro's acid solution can escape from the tube without first contacting and being quenched and cooled by water which is in the container. Thus, both quenching, that is cooling of the Caro's acid mixture, is obtained along with simultaneous dilution.

The amount of water employed for water dilution and quenching is not critical and can vary widely. For example we have found that from 1/1 to 200/1 weight dilution of water to Caro's acid is effective. Obviously, larger amounts of water can be used without deleterious affects. The dilution water can be at any temperature which will cool the Caro's acid mixture. Temperatures from about 5° to about 45° C. are useful with ambient temperatures being preferred because they are the most economical. Since the temperature of the Caro's acid mixture exiting from the Caro's acid reactor is normally from about 52° C. to 98° C., any temperature below 52° C. will usually be effective. Obviously the lower the temperature of the dilution water the more effective will be the results since it will minimize decomposition and hydrolysis of the Caro's acid.

At an experimental test site where the invention was undergoing testing an unusual event unexpectedly allowed the evaluation of the invention in a visual mode. The testing was carried out with a tailing slurry recovered from a gold extraction using sodium cyanide as the extracting agent. In this case the Caro's acid is employed to reduce the cyanide levels in the tailings slurry. In the first instance the Caro's acid was added to the tailing slurry without any water to quench the Caro's acid mixture. The Caro's acid mixture exited from the outlet pipe of a static Caro's acid reactor several inches above the tailing slurry pond and dropped into the tailing slurry. The tailing slurry in contact with undiluted Caro's acid turned green. It is believed that the green color was due to some component of the ore slurry such as a heavy metal changing color under oxidation and/or acid conditions. Once the Caro's acid mixed with the slurry the green color disappeared. Thus, the green color provided a unique visual opportunity to observe mixing patterns of Caro's acid with the slurry and to observe any unreacted Caro's acid which was green in color and which floated on top of the tailing slurry. In the absence of water quenching and dilution, a mist formed around the outlet pipe and scattered pools of Caro's acid could be observed, green in color, floating on top of the warm slurry (containing 37 weight percent solids) and could be seen bubbling (decomposing) and emitting an acid mist prior to disappearing into the slurry. Also, green streaks were also seen at the surface of the slurry at a slurry outlet pipe located downstream about 12 feet from the Caro's acid injection point. After water quenching and dilution of the Caro's acid mixture exiting from the outlet pipe, the pools of Caro's acid floating on the slurry were much smaller, disappearing very quickly, and the bubbling previously seen in the absence of water dilution was absent. In addition no green streaks were evident at the slurry pipe outlet 12 feet downstream from the Caro's acid addition point. The mixing of the Caro's acid into the slurry was due to the thinning effect of the water on the Caro's acid. The water quenching and dilution of the Caro's acid eliminated the acid mist and improved mixing of the Caro's acid due to the cooling and thinning effect of the added water.

While an important use of the invention is the application of Caro's acid for detoxification of cyanides ($CN^-$) and WAD (Weakly Acid Dissociable) $CN^-$ in gold mine tailings slurries, the invention can also be used in any other application where Caro's acid is prepared on site and injected into a substrate to destroy, deodorize, decolor, or alter a chemical composition. Among such applications is the delignification of wood pulp, phenol destruction and decolorization and deodorization of a wide variety of waste water solutions and slurries.

By carrying out the present process of quenching the hot Caro's acid mixture before using the Caro's acid to treat tailing slurry for reduction of their cyanide concentrations, it has been found that the efficiency of cyanide destruction is materially increased without increasing the amount of Caro's acid used in the process. This additional benefit of using the instant quenching operation results because of two separate actions that take place when the Caro's acid is quenched. Initially the Caro's acid is rapidly cooled by the quenching step and this prevents rapid decomposition of the hot Caro's acid with the loss of oxidizing potential. In addition the water dilutes the Caro's acid considerably and makes it a much thinner solution than the viscous mixture that exits from the Caro's acid reactor. This is important because when this Caro's acid mixture is added to the viscous tailing slurry the diluted Caro's acid which has much less viscosity can readily mix with the tailing slurry as compared with the more syrupy viscous Caro's acid which is undiluted. The faster mixing diluted Caro's acid can thus react quickly with the cyanide values in the tailing slurry and thereby reduce decomposition of Caro's acid from unmixed pools of Caro's acid floating on top of the tailing slurry. By contrast, when the Caro's acid is not diluted, the syrupy Caro's acid mixture exiting from the Caro's acid reactor forms many large pools on the surface of the tailing slurry and these pools can be seen to be bubbling indicating that the hot Caro's acid is decomposing. This is wasteful of oxidizing potential of the Caro's acid and of course, diminishes the effectiveness of the Caro's acid in reducing the cyanide concentration in the tailing slurry. By quenching the Caro's acid mixture as it issues from the Caro's acid reactor, decomposition of the hot Caro's acid is eliminated by cooling it and the now thinned Caro's acid can more readily react and mix with the tailing slurry without first being subjected to decomposition before it mixes and reacts with the cyanide in the tailing slurry. This was completely unexpected and is an additional bonus of the process along with elimination or reduction of the Caro's acid mist.

The following are examples which illustrate the use of the present process.

EXAMPLE 1

Generation and Use of Caro's Acid Without Water Quenching-Prior Art

A Caro's acid generator, consisting of a funneling zone attached to a static tubular reactor installed in a vertical position beneath the funneling zone and containing four (4) mixing elements was placed over a sump filled with tailing slurry that contained residual cyanide values. The funneling zone was open to the atmosphere as was the outlet of the static reactor. Sulfuric acid in the amount of 0.85 gallons per minute of 93% by weight $H_2SO_4$ and 0.20 gallons per minute of 70 weight percent of $H_2O_2$ was added to the funneling zone and produced from the bottom of the reactor a mixture containing 27% Caro's acid on a continuous basis. The Caro's acid mixture was passed directly into the sump to treat a stream of 840 gallons per minute of the tailing slurry containing 1.3 lbs. per minute of cyanide ($CN^-$). This equated to a Caro's acid/cyanide mole ratio of 0.71/1 and resulted in a 43.3% destruction of WAD cyanide ($CN^-$). The hot Caro's acid exiting from the Caro's acid generator was not treated in any way before it fell into the sump containing the tailing slurry. Caro's acid mist was prevalent in the vicinity of the Caro's acid addition point.

Generation and Use of Caro's Acid with Water Quenching-Inventive Process

The same equipment and reagents were used as in the example above except that the 840 gallons per minute of tailing slurry contained 1.5 lbs. per minute of cyanide ($CN^-$) and this was treated with the Caro's acid prepared from 1.0 gallon per minute of 93% sulfuric acid and 0.25 gallons per minute of 70% hydrogen peroxide all weight percent). This equated to a cyanuric acid/cyanide mole ratio of 0.64/1 and resulted in a 68% destruction of WAD cyanide ($CN^-$). During this run a spray of water was directed towards the end of Caro's acid outlet pipe so that it impinged directly on the hot Caro's acid mixture exiting from the Caro's acid reactor. The water was at ambient temperature and the amount of water used was estimated to be in excess of a weight ratio of water to Caro's acid of 10:1. There was no detectable Caro's acid mist present in the vicinity of the Caro's acid outlet pipe. For a brief time during the trial the water that was being sprayed on the outlet pipe was shut off and shortly thereafter the acid mist returned immediately. When the water was turned on again, allowing the water spray to impinge upon the outlet of the Caro's acid pipe, the acid mist quickly disappeared.

EXAMPLE 2

Another run was made using the same Caro's acid generator and reagents as in Example 1, except that the 840 gallons per minute of tailing slurry contained 1.8 lbs/minute of cyanide values ($CN^-$) and was treated with Caro's acid prepared from 1.0 gallons per minute of 93% by weight $H_2SO_4$ and 0.25 gallons per minute of 70% by weight $H_2O_2$. This equated to a Caro's acid/cyanide mole ratio of 0.64/1 and resulted in a 50% destruction of WAD cyanide ($CN^-$). During this run a large plastic bucket was positioned under the Caro's acid outlet pipe and a stream of water was continually added to the bucket. The level of the Caro's acid outlet pipe was below the water level in the bucket and the Caro's acid and water mixture in the bucket overflowed into the tailings slurry contained below it. No Caro's acid mist was present and no bubbling of any pockets of Caro's acid pools floating on top of the slurry were observable in the vicinity of the Caro's acid injection point. Also no green streaks were evident on the surface of the tailings slurry in the slurry pipe outlet 12 feet downstream from the Caro's acid injection point. By contrast, when the Caro's acid was permitted to flow directly into the tailing slurry without being quenched with water, pools of Caro's acid which were green colored floated on top of the slurry and were seen to be bubbling indicating Caro's acid decomposing. Further green streaks were evident at the slurry pipe outlet 12 feet downstream from the Caro's acid injection point and there was substantial Caro's acid mist surrounding the area where the outlet pipe from the Caro's acid generator fed the hot Caro's acid mixture to the tailing slurry.

What is claimed is:

1. A process for treating precious metal tailing slurries with a Caro's acid mixture accompanied by reduced amounts of Caro's acid mist, said process comprising:

(a) reacting sulfuric acid and hydrogen peroxide in a reaction zone to form a hot Caro's aced mixture (b) removing the hot Caro's acid mixture at a temperature of at least 52° C. from the reaction zone, said hot Caro's acid mixture accompanied by whatever Caro's acid mist is formed from said Caro's acid;

(c) quenching said hot Caro's acid mixture with water outside the reaction zone to both cool and dilute said hot Caro's acid mixture;

(d) introducing the resulting cooled and diluted Caro's acid mixture, whose evolution of Caro's acid mist has been reduced or eliminated, into a precious metal tailings slurry, the tailings slurry containing cyanide values; and (e) reacting the cyanide values with the Caro's acid to reduce the amount of cyanide values remaining in the tailings slurry.

2. The process of claim 1 wherein the tailings slurry is 35% to 40% solids.

3. The process of claim 1 wherein the water used for quenching the hot Caro's acid mixture is employed in a water to Caro's acid weight ratio of 1:1 to 200:1.

4. The process of claim 3 wherein the water used for quenching the hot Caro's acid mixture has a temperature of from about 5° C. to about 45° C.

5. The process of claim 1 wherein the sulfuric acid has a concentration of about 85% to about 98% by weight $H_2SO_4$ and the hydrogen peroxide has a concentration of about 50% to about 90% by weight $H_2O_2$.

6. The process of claim 5 wherein the mole ratio of $H_2SO_4$ to $H_2O_2$ is about 1:1 to about 4:1.

7. The process of claim 1 wherein the reaction zone is a static tubular reactor.

8. The process of claim 1 wherein the hot Caro's acid mixture flows from the reacton zone by an exit tube that is placed into a container full of water, below water level, and a continuous stream of water is directed into said container.

9. The process of claim 1 wherein the precious metal tailing slurry contains cyanide values from gold extraction using sodium cyanide as the extracting agent.

10. The process of claim 9 wherein the sulfuric acid has a concentration of about 85% to about 98% by weight $H_2SO_4$ and the hydrogen peroxide has a concentration of about 50% to about 90% by weight $H_2O_2$.

11. The process of claim 10 wherein the mole ratio of $H_2SO_4$ to $H_2O_2$ is about 1:1 to about 4:1.

12. The process of claim 11 wherein the water used for quenching the hot Caro's acid mixture is employed in a water to Caro's acid weight ratio of 1:1 to 200:1.

13. The process of claim 12 wherein the tailings slurry is 35% to 40% solids.

14. The process of claim 1 wherein the sulfuric acid has a concentration of about 93% by weight $H_2SO_4$ and the hydrogen peroxide has a concentration of about 70% by weight $H_2O_2$.

15. The process of claim 14 wherein the mole ratio of $H_2SO_4$ to $H_2O_2$ is about 2:1 to about 3:1.

* * * * *